United States Patent [19]

Takeda

[11] Patent Number: 4,813,625
[45] Date of Patent: Mar. 21, 1989

[54] TAPE MEASURE

[75] Inventor: Syunya Takeda, Moriguchi, Japan

[73] Assignee: Sekisui Jushi Kabushiki Kaisha, Osaka, Japan

[21] Appl. No.: 579,821

[22] Filed: Feb. 13, 1984

[30] Foreign Application Priority Data

Feb. 16, 1983 [JP] Japan .................. 58-21425[U]

[51] Int. Cl.⁴ .................. B65H 75/40; G01B 3/10
[52] U.S. Cl. ........................ 242/84.8; 33/761
[58] Field of Search .......... 242/84.8, 100, 106; 33/138, 139, 140

[56] References Cited

U.S. PATENT DOCUMENTS 1,956,806  5/1934  Mitzen et al. ............. 242/100
2,576,629  11/1951  Morby .................... 33/134
4,032,056  6/1977  Ito ....................... 226/154
4,197,656  4/1980  Lane et al. ............... 33/414

FOREIGN PATENT DOCUMENTS 55-145303  10/1980  Japan ................... 242/84.8

Primary Examiner—Harvey C. Hornsby
Assistant Examiner—Scott J. Haugland
Attorney, Agent, or Firm—Armstrong, Nikaido, Marmelstein & Kubovcik

[57] ABSTRACT

A quick rewind tape measure having a reel rotatably supported in an outer case with a handle adapted to rotate the reel to rewind a measuring tape. A smaller externally toothed pinion gear is secured to a shaft supporting the reel and a larger internally toothed ring gear is secured to a shaft of the handle and engages the smaller gear. A spring can be provided to press the outer face of the larger gear to keep it in contact with the smaller one.

12 Claims, 3 Drawing Sheets

TAPE MEASURE

BACKGROUND OF THE INVENTION

This invention relates to tape measure, particularly a quick rewindable tape measure.

A tape measure has hitherto been made by rotatably placing a reel in an outer case and winding a measuring tape around the reel to house the tape in the case when unused. There has been a tape measure in which a coil spring is provided in the interior of the reel and the measuring tape can be automatically rewound around the reel by the restoring force of the spring. This type of tape measure generally been utilized when the tape has a comparatively short length, particularly less than a length of 10 m. Since it is difficult to rewind the tape by the restoring force of a spring when the measuring tape is of a length from 10 m to 100 m, tape measures have been made so that the measuring tape can be rewound by rotating a handle by hand. Tape measure of this kind were prepared by rotatably placing a reel in a case to enable winding the tape around the reel and also by providing a side of the case with a handle for rotating the reel.

In the case wherein a string is used for measuring the length instead of a tape, twisting of the string causes no trouble when it is rewound. For a device using a string, a quick rewind measure has been prepared hitherto in which the rewind speed was increased to be a few times that of the speed of the handle. In contrast, in the case wherein a tape is used for measuring the length, if the tape is rewound in a high speed, the tape is liable to be twisted. Consequently, a quick rewind tape measure has not been manufactured hitherto.

A kind of the quick rewind tape measure has recently become known. It is disclosed, for example, in Japanese Unexamined Utility Model Publication No. 55-145303. The quick rewind tape measure, however, disclosed in said Publication has a bigger gear having teeth on its outer periphery secured to the handle, and a smaller gear also having teeth on its outer periphery secured to the reel with both gears being engaged. In other words, both gears are nothing but pinions having externally facing gear teeth and are simply engaged in an external relation. As a result, the reel was rotated in the direction reverse to the rotating direction of the handle, and the reel center was greatly distant from the handle center. Thus, when the tape measure is to be rewound, the handle must be rotated in the reverse direction. Rewinding the tape measure could not be smoothly operated. Further, the tape measure itself could not be made compact. Consequently, these were disadvantages of the quick rewind tape measure.

SUMMARY OF THE INVENTION

The present invention aims to eliminate the disadvantages and to provide an improved quick rewind tape measure. In order to achieve this, the invention requires that a bigger gear and a smaller gear are secured to the handle and the reel, respectively, (in this respect the present invention is the same as the known one). However, the gear secured to the handle is a ring gear having internal teeth, that is, teeth on an inner periphery facing inwardly, while the gear secured to the reel is a pinion gear having external teeth that is, teeth on an outer periphery facing outwardly. The gear having teeth on its outer peripher is placed within the ring gear to be in internal contact and in engagement with the ring gear.

According to the present invention there is provided a quick rewind tape measure formed by rotatably placing in an outer case a reel for winding a tape, providing a handle on the outer side of the case so that the reel can be rotated by the handle to rewind a measuring tape, which tape measure is characterized in that a smaller pinion gear is secured to a shaft supporting the reel, a bigger ring gear having inwardly directed teeth is secured to a shaft of the handle, and the pinion gear is positioned within the ring gear and contacted and engaged with the ring gear.

BRIEF DESCRIPTION OF THE DRAWINGS

The present invention is explained below referring to the accompanying drawings, in which:

FIG. 1 is a front view of the tape measure, FIG. 2 is a sectional view taken along line II—II in FIG. 1, and FIG. 3 is a front view of the reel, partly cut away, used in FIG. 1.

FIG. 4 is a front view of the tape measure, FIG. 5 is a front view of the tape measure, in which a half side has been cut away, FIG. 6 is a front view of the tape measure in which a reel has been removed and FIG. 7 is a perspective, partially exploded view of the tape measure, in which a shaft supporting plate has been removed.

DETAILED DESCRIPTION OF PREFERRED EMBODIMENTS

Figure 1:
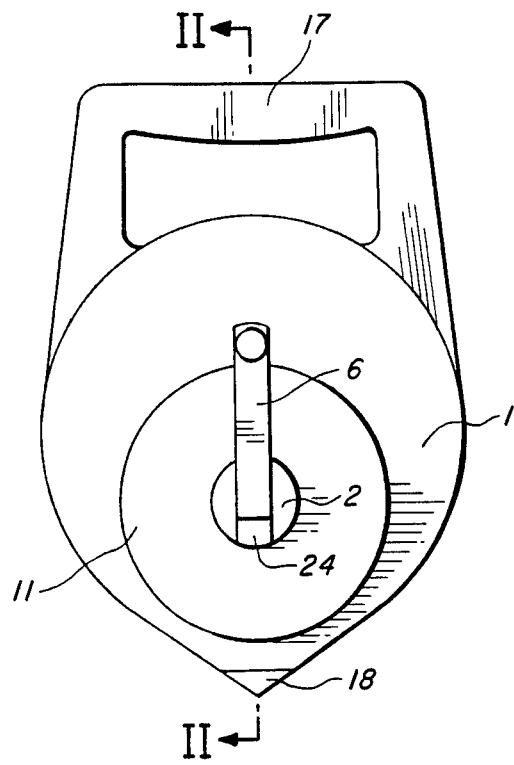
FIGS. 1–3 show an example of the tape measure according to the invention, particularly.
Figure 2:
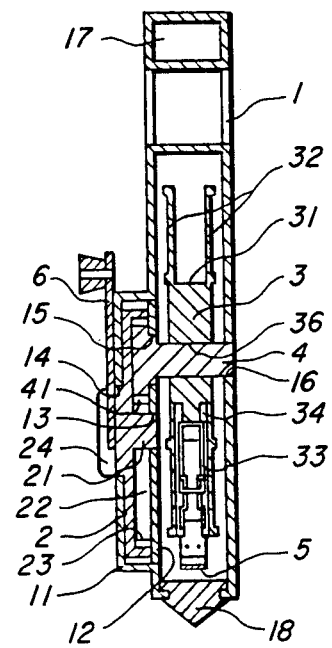
Figure 3:
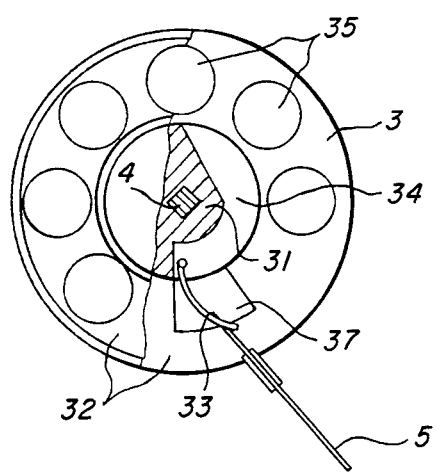
Figure 4:
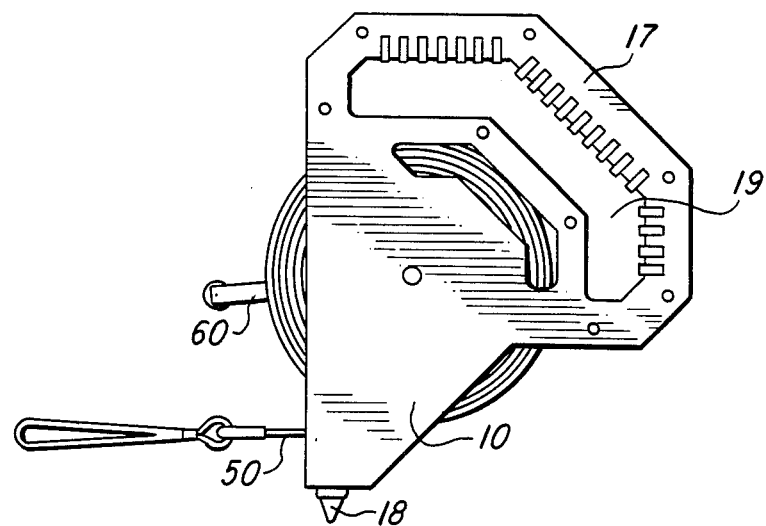
FIGS. 4–7 show another example of the tape measure according to the invention, particularly.
Figure 5:
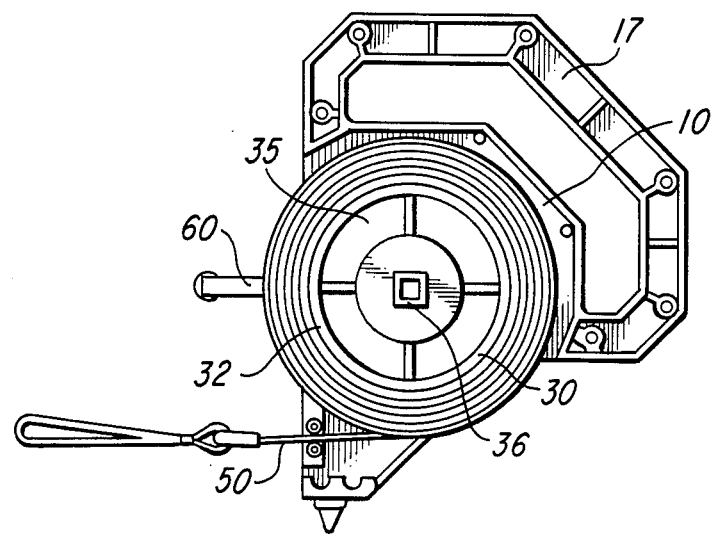
Figure 6:
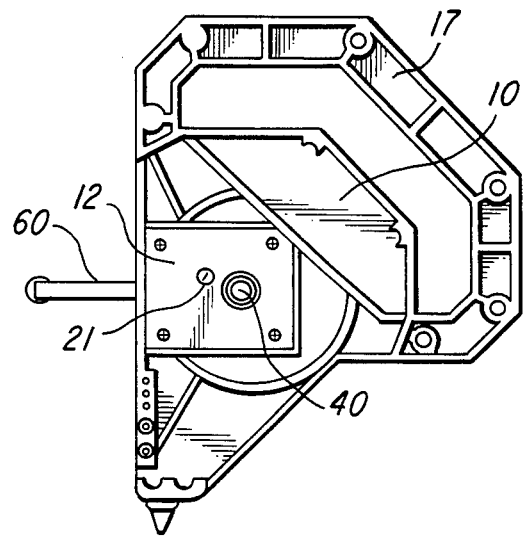
Figure 7:
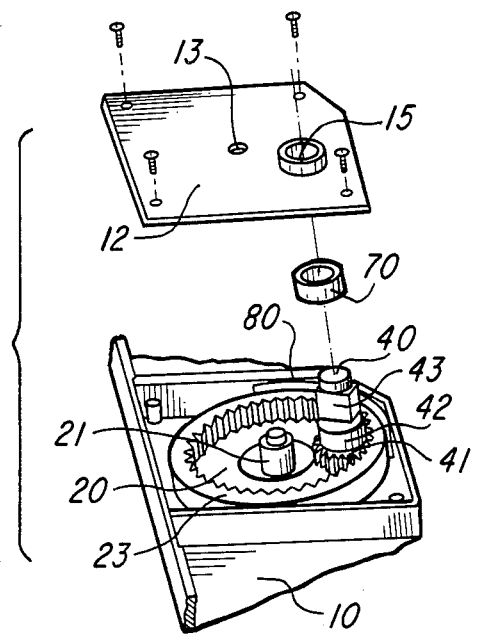

Referring to FIGS. 1–3, case 1 has a grip 17 at the upper portion thereof and a stake point 18 at the lower portion thereof. Case 1 is also provided with winder 2 including handle 6 and shaft 21 integrally formed with handle 6.

Winder 2 is provided with a protruding portion 11 annexed to case 1. The winder 2 is situated between and supported by the wall of protruding portion 11 and a supporting plate 12 covering the opening of protruding portion 11. Supporting portion 24 of handle 6 is fitted and rotatably supported in an aperture 14 of protruding portion 11. As a result, winder 2 can be rotated in case 1 when handle 6 is driven. The interior of winder 2 is recessed at 22 except for shaft 21, and internally facing gear teeth are formed on the entire inner peripheral wall of the recessed portion.

A reel 3 for winding tape is housed in case 1 and has a measuring tape 5 windable therearound. The reel 3, as shown in FIGS. 2 and 3, is provided with flanges 32 having a large diameter at each of both sides of shaft 31, which is provided with ring 33 for fastening the end of the measuring tape 5 and groove 34 for receiving ring 33 when the ring 33 is laid down. Each of flanges 32 is provided with a plurality of apertures distributed on the entire surface of the flanges 32. The apertures serve to remove sand and water adhering to the measuring tape when the tape measure is washed with water. Each of flanges 32 is further provided with another aperture 37 which is for either securing or removing the end of the measuring tape 5 from ring 33.

A shaft 4 supports the reel and can be inserted into center hole 36 of reel 3. One side of shaft 4 is supported by aperture 15 in supporting plate 12 and the other side of shaft 4 by aperture 16 is case 1. Center hole 36 of reel 3 is made square in cross section and shaft 4 is made also partly square in the outer shape thereof so that shaft 4 is prevented from idling in the reel 3. Shaft 4 extends on the side of supporting plate 12 to reach the winder 2. The extended portion is provided with a pinion gear 41 having a smaller diameter and gear teeth on its external periphery, which are engaged with the radially inwardly directed teeth of ring gear 23. Thus, shaft 4 is rotatably received in the case and is provided with the pinion gear 41 placed between winder 2 and supporting plate 12.

The measuring tape 5 is made of a band steel, a fiber-reinforced synthetic resin band or the like, and has usually a length of 50 m to 100 m.

Winder 2, for example, has a ring gear 23 of an inside diameter of 45 mm, shaft 4 has a pinion gear 41 of an outside diameter of 12 mm, and pinion gear 41 is positioned within the ring gear 23. Rotation ratio of ring gear 23 to pinion gear 41 is 1 to 3.75. Drum 31 in reel 3 has the outside diameter of 63 mm, which holds a ring 33, and a measuring tape of steel having 50 m in length is secured to ring 33. When handle 6 is rotated, all of the steel tape measure can be readily rewound. Forty rotations of the handle are sufficient to rewind all of the measuring tape and the measuring tape can be rewound by a small number of rotations. Further, since the measuring tape can be rewound in the same direction as the handle rotating direction, unusual feeling is not brought during rewind of the measuring tape and the measuring tape can be rewound smoothly. In contrast, when the reel is directly connected with and rotated by the handle to rewind the measuring tape having the length of 50 mm around the reel, one hundred fifty rotations of the handle are required for rewinding the measuring tape and operations for rewinding the measuring tape are troublesome.

Referring now to FIGS. 4 to 7, another tape measure according to the present invention is further explained below. The tape measure is formed by housing in a case 10 a reel 30 for winding the measuring tape 50, a winder 20, and shaft 40 for supporting and rotating reel 30. Case 10 is formed by opposing and screwing two symmetrical plates. An opening 19 extending through said two plates is formed in a portion opposite to an exit of the measuring tape in case 10. The outer fringe of opening 19 forms grip 17'. Grip 17' is formed in a shape-like three sides of a regular octagon around the shaft 40 supporting the reel 30, and includes at least three straight portions continuing and turning at an angle of 135°. Stake point 18' is formed on the opposite side of grip 17'.

Winder 20 is connected with handle 60 outside of the case. The base of handle 60 is fitted in an aperture in case 10 and set rotatably in case 10. A metal ring is secured to case 10 between the aperture in case 10 and the base of handle 60 for smoothly rotating handle 60. Winder 20 is provided with a ring gear 23 and shaft 21, both of which are integrally formed with winder 20. Winder 20 is made of a hard thermoplastic synthetic resin, for example, polyacetal.

Shaft 40 is placed inside of the ring gear 23. Shaft 40 is provided with a pinion gear 41 at one end having radially outwardly directed teeth. Middle portion 42 of shaft 40 is fitted in aperture 14' at one end. Middle portion 42 of shaft 40 is fitted in aperture 14 in supporting plate 12', with one end of shaft 21 being simultaneously fitted in aperture 13' in supporting plate 12. Both shaft 40 and 21 are rotatably supported by supporting plate 12, resulting in engaging the pinion gear 41 with the ring gear 23. Shaft 40 and supporting plate 12 are preferably made of hard thermoplastic synthetic resin such as polyacetal.

Plate spring 80 is provided in the vicinity of the portion at which the pinion gear 41 is internally contacted with the ring gear 23. Plate spring 80 urges the ring gear 23 to press pinion gear 41 so that pinion gear 41 may be ensured to engage with ring gear 23 and thus serves to prevent gears from generating frictional sounds when rotated.

Metal ring 70 is interposed between middle portion 42 of shaft 40 and aperture 14' of supporting plate 12' so that shaft 40 is rotated smoothly and prevented from abrasion thereof.

Shaft 40 has a square outer shape in cross section of portion 43 which is set just outside of supporting plate 12'. Reel 30 is placed on portion 43. Central aperture 36' in reel 30 is made square so that reel 30 can be just fitted in portion 43. Reel 30 has further two flanges 32' at both sides thereof, and each flanges 32' has perforations 35'. In the other respects, reel 30 has a same structure as that shown in FIGS. 1–3 so that measuring tape 50 can be seated between flanges 32' of reel 30.

According to the present invention, winder 20 is provided with a ring gear having teeth on its inner periphery, which is engaged with a pinion gear having teeth of its outer periphery formed on the shaft for rotating the reel. When the handle mounted on the winder is rotated, the reel is rotated in a high speed in proportion to the rotation ratio of the ring gear to the pinion gear, thus the measuring tape can be rewound in a high speed. Consequently, the tape measure has the advantage that an elongate measuring tape having a length of more than 10 m, particularly 50 m to 100 m can be rewound quickly.

Further, according to the present invention, the winder is provided with the ring gear, and therefore the winder can be rotated in the same direction as that of the reel, so that the tape measure can be rewound in the same direction as the handle rotating direction, hence the measuring tape can be smoothly rewound.

Furthermore, according to the invention, the winder is provided with the ring gear, and therefore the winder shaft can be provided in close proximity to the shaft for the reel, thus the tape measure as a whole is stable at the time of rewinding. Hence the measuring tape can be rewound more smoothly. Still further, the pinion gear is placed in the recessed portion of the winder, and the case can be decreased in volume, consequently the tape measure is convenient to carry.

Yet further, the winder and the shaft are made of a hard thermoplastic resin, therefore can be easily manufactured. Even when they are rotated at a high speed, they generate less noise, further since the metal ring is provided at the contacting portion thereof, they are less abraded.

Furthermore, since the plate spring is provided in the portion where the pinion gear is internally contacted with the ring, so as to press the outside periphery of the ring gear towards the pinion gear, the pinion gear is firmly engaged with the ring gear. When the shaft is rotated at a high speed, the gears are prevented from generating noise.

The invention brings about various advantages as mentioned above.

It is readily apparent that the above-described tape measure meets all of the objects mentioned above and also has the advantage of wide commercial utility. It should be understood that the specific form of invention hereinabove described is intended to be representative only, as certain modifications within the scope of these teachings will be apparent to those skilled in the art.

Accordingly, reference should be made to the following claims in determining the full scope of invention.

What is claimed is:

1. A quick rewind tape measure comprising:
   an outer case,
   a reel having a reel shaft and being rotatably supported in said outer case by said reel shaft for winding a measuring tape,
   a handle having a handle shaft rotatably mounted on an outside of said outer case,
   a smaller pinion gear having teeth on its outer periphery and being secured to said reel shaft,
   a bigger ring gear having teeth on its inner periphery and being secured to said handle shaft, said pinion gear being positioned radially inwardly of said ring gear and engaging said ring gear.

2. A quick rewind tape measure comprising:
   an outer case,
   a reel having a reel shaft and being rotatably supported in said outer case by said reel shaft for winding a measuring tape,
   a handle having a handle shaft rotatably mounted on an outside of said outer case,
   a smaller pinion gear having teeth on its outer periphery and being secured to said reel shaft,
   a bigger ring gear having teeth on its inner periphery and being secured to said handle shaft, said pinion gear being positioned radially inwardly of said ring gear and engaging said ring gear, and
   a spring mounted in said outer case engaging an outer portion of said ring gear to press said ring gear to keep contact with said pinion gear.

3. A quick rewind tape measure according to claim 1 wherein the reel shaft and the smaller pinion gear are formed integrally of a hard synthetic resin.

4. A quick rewind tape measure according to claim 3, wherein said outer case includes a supporting plate made of a hard synthetic resin, the reel shaft is supported by said supporting plate, and a metal ring is interposed between the reel shaft and the supporting plate.

5. A quick rewind tape measure according to claim 4 wherein the outer case further includes a grip for carrying the case at a portion opposite to an exit of the measuring tape, and the grip is formed in a shape having three sides of a regular octagon around the reel shaft and includes at least three straight portions continuing the turning at an angle of 135°.

6. A quick rewind tape measure according to claim 3 wherein the outer case further includes a grip for carrying the case at a portion opposite to an exit of the measuring tape, and the grip is formed in a shape having three sides of a regular octagon around the reel shaft and includes at least three straight portions continuing the turning at an angle of 135°.

7. A quick rewind tape measure according to claim 1 wherein the outer case further includes a grip for carrying the case at a portion opposite to an exit of the measuring tape, and the grip is formed in a shape having three sides of a regular octagon around the reel shaft and includes at least three straight portions continuing the turning at an angle of 135°.

8. A quick rewind tape measure according to claim 2 wherein the reel shaft and the smaller pinion gear are formed integrally of a hard synthetic resin.

9. A quick rewind tape measure according to claim 8, wherein said outer case includes a supporting plate made of a hard synthetic resin, the reel shaft is supported by said supporting plate, and a metal ring is interposed between the reel shaft and the supporting plate.

10. A quick rewind tape measure according to claim 9 wherein the outer case further includes a grip for carrying the case at a portion opposite to an exit of the measuring tape, and the grip is formed in a shape having three sides of a regular octagon around the reel shaft and includes at least three straight portions continuing the turning at an angle of 135°.

11. A quick rewind tape measure according to claim 8 wherein the outer case further includes a grip for carrying the case at a portion opposite to an exit of the measuring tape, and the grip is formed in a shape having three sides of a regular octagon around the reel shaft and includes at least three straight portions continuing the turning at an angle of 135°.

12. A quick rewind tape measure according to claim 2 wherein the outer case further includes a grip for carrying the case at a portion opposite to an exit of the measuring tape, and the grip is formed in a shape having three sides of a regular octagon around the reel shaft and includes at least three straight portions continuing the turning at an angle of 135°.

* * * * *